United States Patent
Hirozawa et al.

(10) Patent No.: US 10,337,171 B2
(45) Date of Patent: Jul. 2, 2019

(54) HYBRID CONSTRUCTION MACHINE

(71) Applicant: KOBELCO CONSTRUCTION MACHINERY CO., LTD., Hiroshima-shi (JP)

(72) Inventors: Mitsunori Hirozawa, Hiroshima (JP); Takayuki Doi, Hiroshima (JP)

(73) Assignee: KOBELCO CONSTRUCTION MACHINERY CO., LTD., Hiroshima-shi (JP)

( * ) Notice: Subject to any disclaimer, the term of this patent is extended or adjusted under 35 U.S.C. 154(b) by 286 days.

(21) Appl. No.: 15/119,271

(22) PCT Filed: Jan. 13, 2015

(86) PCT No.: PCT/JP2015/050681
§ 371 (c)(1),
(2) Date: Aug. 16, 2016

(87) PCT Pub. No.: WO2015/129309
PCT Pub. Date: Sep. 3, 2015

(65) Prior Publication Data
US 2017/0008506 A1    Jan. 12, 2017

(30) Foreign Application Priority Data

Feb. 26, 2014  (JP) .................. 2014-035258

(51) Int. Cl.
*E02F 9/22*   (2006.01)
*E02F 9/20*   (2006.01)
(Continued)

(52) U.S. Cl.
CPC .......... *E02F 9/2246* (2013.01); *B60W 10/06* (2013.01); *B60W 10/08* (2013.01); *B60W 20/00* (2013.01);
(Continued)

(58) Field of Classification Search
CPC ...... B60W 20/00; B60W 20/10; B60W 10/06; B60W 10/08
See application file for complete search history.

(56) References Cited

U.S. PATENT DOCUMENTS

2006/0229786 A1   10/2006  Sawada
2009/0320461 A1   12/2009  Morinaga et al.
(Continued)

FOREIGN PATENT DOCUMENTS

EP   1 398 512 A1   3/2004
EP   2 778 003 A1   9/2014
(Continued)

OTHER PUBLICATIONS

Extended European Search Report dated Feb. 1, 2017 in Patent Application No. 15754995.7.
(Continued)

*Primary Examiner* — Jelani A Smith
*Assistant Examiner* — Kelly D Williams
(74) *Attorney, Agent, or Firm* — Oblon, McClelland, Maier & Neustadt, L.L.P.

(57) ABSTRACT

Provided is a hybrid construction machine capable of appropriate control of engine speed based on a total load torque, reduction in energy loss due to the power for auxiliary devices and efficient operation of the engine and the generator motor, including a hydraulic pump, a generator motor, an engine, and a control device. The control device includes a total load torque determination section determining a total load torque, the sum of load torques for the hydraulic pump and the generator motor, and an engine speed control section controlling the engine speed based on the total load torque. The engine speed control section performs a regulation control of increasing the engine speed as the total load torque decreases under a high load torque condition and (Continued)

performs an isochronous control of maintaining the engine speed at a constant target speed N2 under a low load torque condition.

1 Claim, 3 Drawing Sheets

(51) Int. Cl.
| | |
|---|---|
| *B60W 20/10* | (2016.01) |
| *B60W 10/06* | (2006.01) |
| *B60W 10/08* | (2006.01) |
| *F02D 31/00* | (2006.01) |
| *B60W 20/00* | (2016.01) |
| *F02D 41/02* | (2006.01) |
| *F02D 29/04* | (2006.01) |
| *F02D 29/06* | (2006.01) |

(52) U.S. Cl.
CPC ........... *B60W 20/10* (2013.01); *E02F 9/2075* (2013.01); *F02D 31/001* (2013.01); *F02D 41/021* (2013.01); *B60W 2300/17* (2013.01); *B60W 2510/083* (2013.01); *B60W 2710/0661* (2013.01); *F02D 29/04* (2013.01); *F02D 29/06* (2013.01); *F02D 2250/18* (2013.01); *Y10S 903/905* (2013.01)

(56) References Cited

U.S. PATENT DOCUMENTS

| | | |
|---|---|---|
| 2010/0186713 A1 | 7/2010 | Kawaguchi et al. |
| 2013/0090835 A1 | 4/2013 | Take et al. |

FOREIGN PATENT DOCUMENTS

| | | |
|---|---|---|
| GB | 2 417 793 A | 3/2006 |
| JP | 2001-323827 A | 11/2001 |
| JP | 2009-174446 A | 8/2009 |
| JP | 2009-174447 A | 8/2009 |
| JP | 2011-241794 A | 12/2011 |
| JP | 2012-031763 A | 2/2012 |
| WO | 2004/099593 A1 | 11/2004 |

OTHER PUBLICATIONS

International Search Report dated Apr. 14, 2015 in PCT/JP2015/050681 filed Jan. 13, 2015.

HYBRID CONSTRUCTION MACHINE

TECHNICAL FIELD

The present invention relates to a hybrid construction machine including a control device for controlling the engine speed.

BACKGROUND ART

The background art of the present invention will be described with reference to a hybrid excavator as an example.

A common hybrid excavator includes an engine, a hydraulic actuator, a hydraulic pump for driving the hydraulic actuator, a generator motor connected to the engine and operable to perform a generator action and a motor action, and an electric device to be charged with electric power generated by the generator action of the generator motor. The generator motor is driven by an electric power stored in the electric storage device to perform the motor action, assisting the engine at a proper time with the power generated by the motor action.

On the other hand, regardless of hybrid excavators or common hydraulic excavators, there is commonly known, as one mode of an engine speed control, a regulation control of changing the engine speed in response to a load torque, as disclosed in Patent Literatures 1 and 2. The regulation control includes adjusting the fuel injection amount so as to change the engine speed between a target speed and a rated speed along a straight regulation line that is set inside an output characteristic line of the engine and slopes downward to the right at a constant angle.

In a hybrid excavator, a load on the engine includes not only a load by the hydraulic pump, but also a load by the generator motor during the power generation. Therefore, the control of the engine speed has to be performed based on a total load torque obtained by adding a load torque of the generator motor to a load torque of the pump. Applying the known technique regarding only a pump load as the engine load directly to a hybrid excavator could not allow the load to be accurately reflected, thus failing to perform basically appropriate control of the engine speed.

Besides, the known technique, where the engine speed is increased with decrease in the load torque, involves an increase in the power for auxiliary devices such as a fan and the like under a low load torque condition, which causes energy loss. Setting the target speed of the regulation characteristic lower, i.e., shifting the regulation line to a lower speed side, in order to reduce the energy loss, permits the increase in a load torque caused by the power generation of the generator motor to further decrease the engine speed in accordance with the regulation characteristic in which the engine speed decreases as the load torque increases. Thus involving an operation under the condition where fuel efficiency of the engine and power generation efficiency of the generator motor are poor makes the energy efficiency be deteriorated.

CITATION LIST

Patent Literature

Patent Literature 1: Japanese Unexamined Patent Publication No. 2012-31763
Patent Literature 2: WO2004/099593

SUMMARY OF INVENTION

An object of the present invention is to provide a hybrid construction machine including an engine and a generator motor and being capable of appropriate control of the engine speed based on a total load torque, reduction in energy loss due to the power for auxiliary devices, and efficient operation of the engine and the generator motor.

Provided is a hybrid construction machine which includes: a hydraulic actuator; a hydraulic pump for driving the hydraulic actuator; a generator motor configured to perform a generator action and a motor action; an engine serving as a power source for the hydraulic pump and the generator motor; an electric storage device to be charged with electric power generated by the generator action of the generator motor; and a control device which controls the speed of the engine. The generator motor is driven by an electric power stored in the electric storage device to perform the motor action, assisting the engine with a power generated by the motor action. The control device includes a total load torque determination section which detects a load torque of the hydraulic pump and a load torque of the generator motor and determines a total load torque which is the sum of the load torques, and an engine speed control section which controls the engine speed based on the determined total load torque. The engine speed control section performs a regulation control of increasing the engine speed along a regulation line with decrease in the total load torque under a condition where the total load torque is equal to or greater than a predetermined reference set value Ts and equal to or less than a rated torque corresponding to a rated speed N0, the regulation line joining the rated speed N0 and a first target speed N1 that is set for a condition where the total load torque is 0, and performs an isochronous control of maintaining the engine speed at a second target speed N2 lower than the first target speed N1 irrespective of the change in total load torque under a condition where the total load torque is less than the reference set value Ts.

DESCRIPTION OF EMBODIMENTS

An embodiment of the present invention will be described with reference to the accompanying drawings. This embodiment illustrates a hybrid excavator, but the present invention is similarly applicable to other hybrid construction machines besides hybrid excavators.

Figure 1:
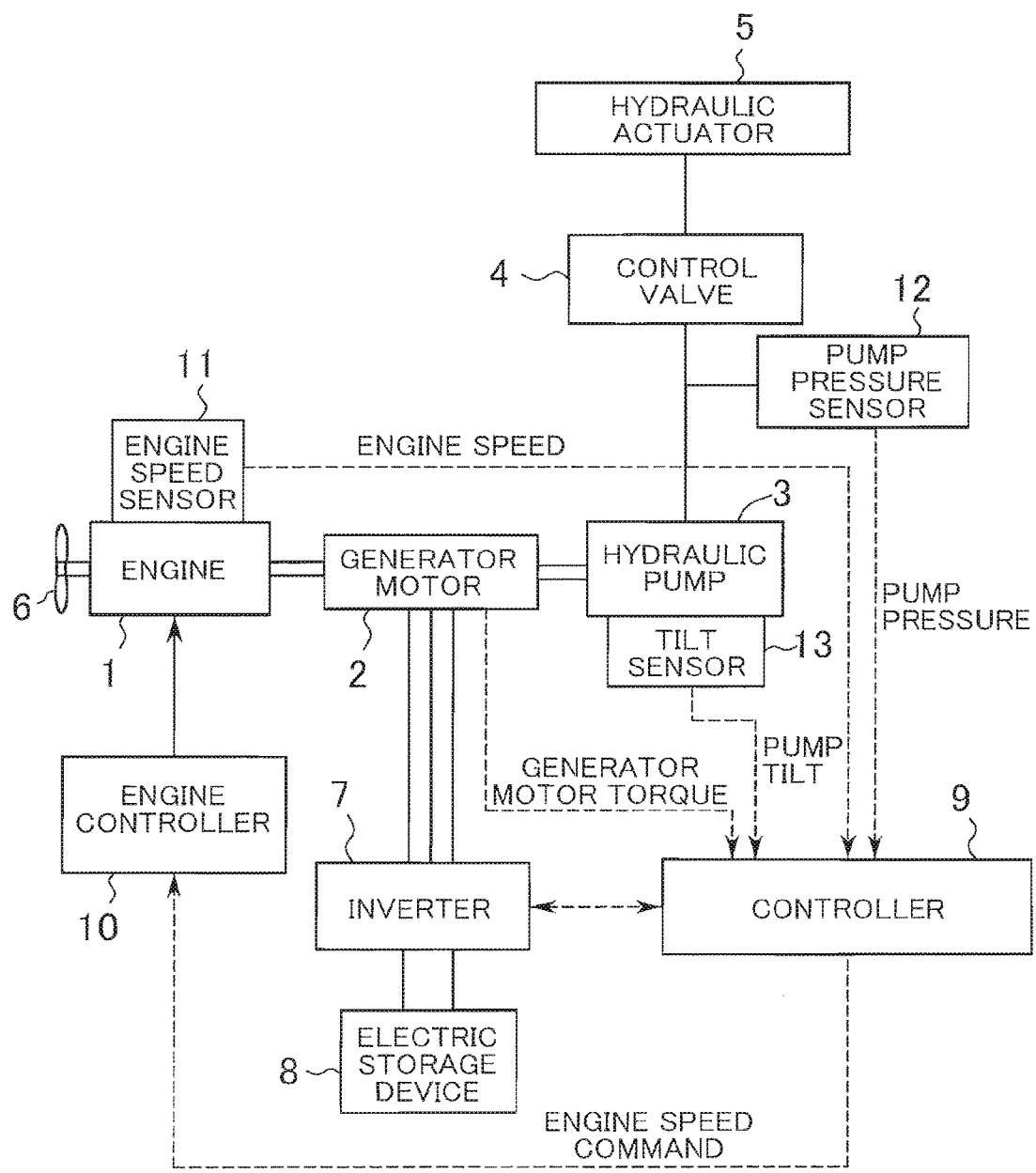
FIG. 1 is a system configuration diagram showing major components of a hybrid construction machine according to an embodiment of the present invention.

FIG. 1 shows major components of a hybrid excavator according to the embodiment. The hybrid excavator includes an engine 1 serving as a power source, a generator motor 2 configured to perform a generator action and a motor action, a plurality of hydraulic actuators 5, a variable displacement type hydraulic pump 3 serving as a hydraulic source for driving the hydraulic actuators 5, control valves 4 disposed between the hydraulic actuators 5 and the hydraulic pump 3, and a cooling fan 6. The generator motor 2, the hydraulic pump 3 and the fan 6 are connected to the engine 1 so as to be driven by the engine 1. The hydraulic pump 3 supplies hydraulic fluid to each hydraulic actuator 5 through the control valve 4, to drive the hydraulic actuator 5.

The hydraulic excavator further includes an inverter 7, an electric storage device 8, a controller 9, and an ECU (Engine Control Unit) 10. The generator motor 2 is driven by the engine 1 to perform the generator action, thereby generating an electric power. The generated electric power is supplied to the electric storage device 8 through the inverter 7, the electric storage device 8 being charged with the electric power, i.e., storing the electric power. The generator motor 2 performs, at a proper time, the motor action to generate a power using an electric power stored in the electric storage device 8, assisting the engine 1 with the power. The inverter 7 performs charge of the electric storage device 8, discharge from the electric storage device 8, and control of operation or the like of the generator motor 2, based on a command from the controller 9. The controller 9 inputs an engine speed command, specifically, a fuel injection amount command, into the ECU 10. The ECU 10 changes the amount of fuel injection in the engine 1 based on the input fuel injection amount command. The engine speed is thus controlled.

The hybrid construction machine further includes a plurality of sensors. The plurality of sensors include an engine speed sensor 11 which detects the engine speed, a pump pressure sensor 12 which detects a pump pressure that is the pressure of hydraulic fluid discharged by the hydraulic pump 3, and a tilt sensor 13 which detects a pump tilt that is the tilt of the hydraulic pump 3. Each of the sensors 11 to 13 generates a detection signal and inputs it into the controller 9. The controller 9 further receives a signal indicating a generator motor torque generated by the generator motor 2.

The controller 9 includes a torque calculation section and an engine speed command section.

The torque calculation section calculates the pump load torque based on the pump pressure, the pump tilt, and the engine speed detected by the sensors 11 to 13, and calculates the total load torque T that is the sum of the calculated pump load torque and the generator motor torque. The torque calculation section and the sensors 11 to 13 constitute a total load torque determination section which determines the actual total load torque T.

The engine speed command section generates an engine speed command based on the total load torque T and inputs it into the ECU 10. The engine speed command section and the ECU 10 constitute an engine speed control section which controls the engine speed, based on the total load torque T. The total load torque determination section and the engine speed control section constitute a control device which controls the engine speed.

Figure 3:
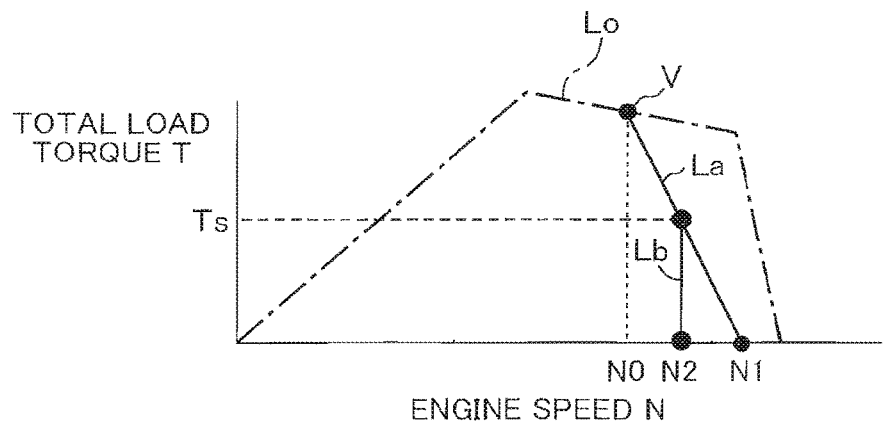
FIG. 3 is a graph showing a basic relationship between engine speed controlled by the controller and total load torque.

The engine speed command section generates and outputs an engine speed command for controlling the engine speed, in accordance with a control line that is set in advance for determining the engine speed corresponding to the total load torque T, namely, a regulation line La and an isochronous line Lb shown in FIG. 3.

The regulation line La is a straight line sloping downward to the right and joining a point V corresponding to a rated point, namely, a rated speed N0, in the output characteristic line Lo and a first target speed (no-load running speed) N1 set for the total load torque T of 0, inside an output characteristic line Lo of the engine 1 shown by the dashed line in FIG. 3. According to the regulation line La, the engine speed is changed between the first target speed N1 and the rated speed N0 in response to the load torque.

The isochronous line Lb is a line branching vertically downward from the regulation line La under a load torque condition where the total load torque T is less than a predetermined reference set value Ts (hereinafter, referred to as "low load torque condition"). According to the isochronous line Lb, the engine speed N is maintained at a second target speed N2 irrespective of the change in total load torque T under the low load torque condition, the second target speed being a constant speed corresponding to the reference set value Ts in the regulation line La. This control is performed by a feedback control including at least a proportional control, preferably, a PID control, the proportional using a proportional gain Kp1. Accordingly, the value obtained by multiplying the difference between the actual engine speed and the second target speed N2 by the proportional gain Kp1 is used as a correction value.

Here, "a constant speed corresponding to the reference set value Ts in the regulation line La" includes not only a speed completely corresponding to the reference set value Ts in the regulation line La but also a speed slightly deviating from the reference set value Ts for a transition control described later.

The engine speed command section generates and outputs an engine speed command to perform a control in accordance with the lines La and Lb based on the magnitude of the total load torque T. Specifically, under the high load torque condition where the total load torque T is equal to or greater than the reference set value Ts, the engine speed command section performs an engine speed command for a regulation control of changing the engine speed N along the regulation line La in response to the total load torque T. On the other hand, under the low load torque condition where the total load torque T is less than the reference set value Ts, the engine speed command section performs an engine speed command for an isochronous control of maintaining the engine speed N at the constant second target speed N2 in accordance with the isochronous line Lb.

The direct transition between the regulation control and the isochronous control, however, involves a great change in the engine speed, thus promoting the control to involve hunting. Besides, the sudden change in the engine speed causes a sense of discomfort to an operator during operation.

Figure 4:
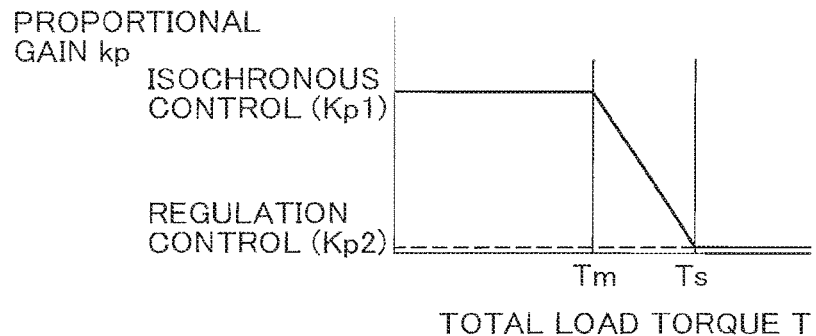
FIG. 4 is a graph showing a relationship between total load torque and proportional gain for a transition control.
Figure 5:
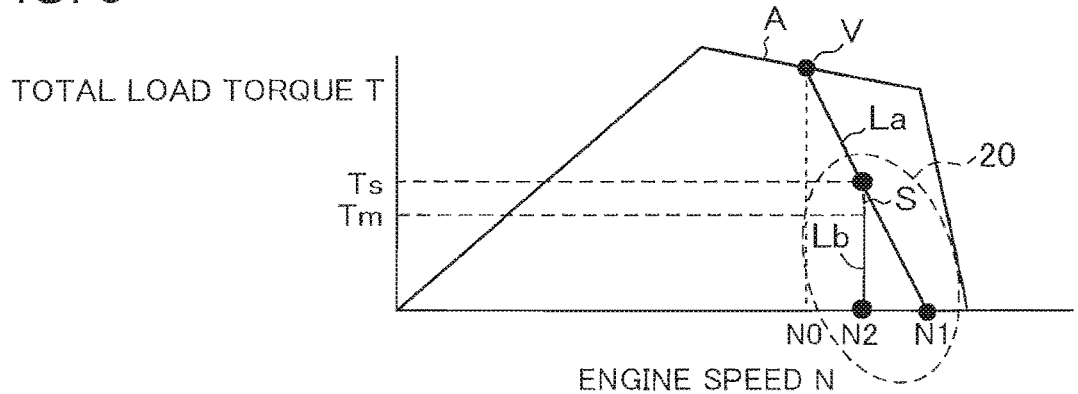
FIG. 5 is a graph showing a relationship between total load torque and engine speed controlled in the transition control.
Figure 6:
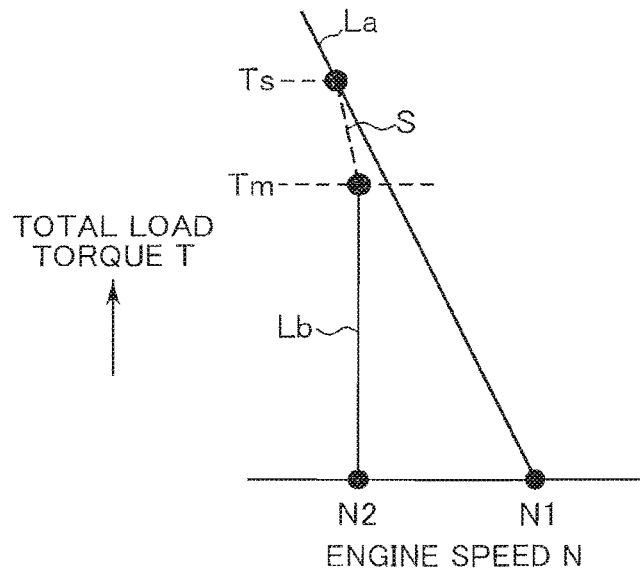
FIG. 6 is an enlarged view of a portion surrounded by a dashed line 20 in FIG. 5.

For the reason, the engine speed control section including the engine speed command section and the ECU 10 performs, during a transition period between the controls, a transition control of gradually changing the proportional gain Kp for the proportional control between a proportional gain Kp1 for the isochronous control and a proportional gain Kp2 ($\approx$0) for the regulation control in response to a change in the total load torque T. Specifically, the engine speed . command section of the controller 9 determines a proportional gain Kp to be used in the transition period based on the relationship between total load torque T and proportional gain Kp shown in FIG. 4, the relationship being set in advance, and uses the determined proportional gain Kp. In other words, as shown in FIG. 4, a transition period set value Tm that is smaller than the reference set value Ts is further set for the total load torque T, and the proportional gain Kp is so set as to gradually change, between the isochronous control gain Kp1 and the regulation control gain Kp2, in response to the total load torque T. The setting of the proportional gain Kp allows the engine speed to gradually change in a transition period S between the regulation control and the isochronous control, the transition period S corresponding to an area between the two horizontal dashed lines shown in FIGS. 5 and 6. This prevents control hunting and a sense of comfort in an operator from being involved by switching between the controls.

Figure 2:
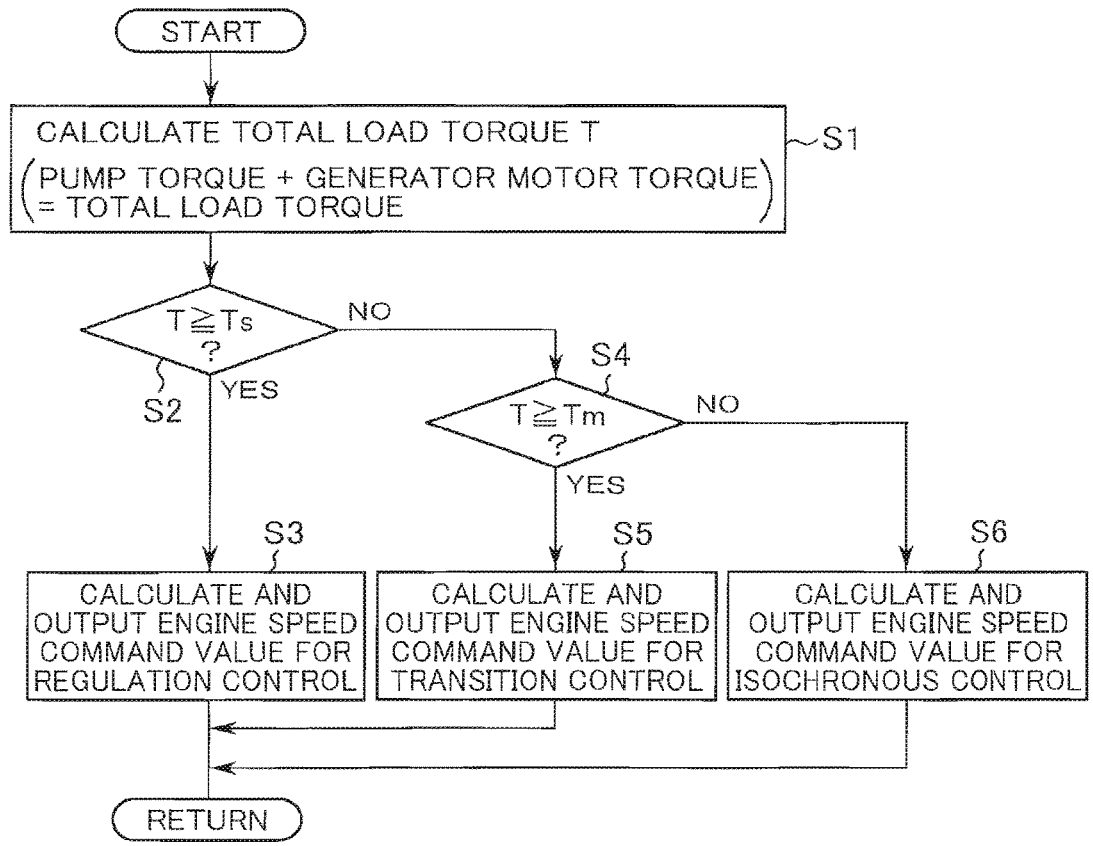
FIG. 2 is a flowchart showing a calculation control operation performed by a controller in the hybrid construction machine.

FIG. 2 is a flowchart showing a calculation control action performed by the controller 9.

The torque calculation section of the controller 9 calculates the total load torque T, which is the sum of the torque of the hydraulic pump 3 and the torque of the generator motor 2, at step S1. The engine speed command section of the controller 9 judges whether or not the calculated total load torque T is equal to or greater than the reference set value Ts.

In the case where the total load torque T is equal to or greater than the reference set value Ts, i.e., under the high load torque condition where T≥Ts (YES at step S2), the engine speed command section calculates and outputs an engine speed command for the regulation control, in response to the total load torque T. The engine speed command is input into the ECU 10 to thereby operate, for example, a governor of the engine 1. Thus is performed the regulation control of increasing the engine speed N with decrease in the total load torque T.

In the case where the calculated total load torque T is less than the reference set value Ts, i.e., under the low load torque condition where T<Ts (NO at step S2), the engine speed command section further judges whether or not the total load torque T is equal to or greater than the transition period set value Tm at step S4.

In the case of T>Tm, i.e., in the case where the total load torque T is between the set values Ts and Tm (YES at step S4), the engine speed command section calculates and outputs an engine speed command for performing the transition control for the transition period S. The engine speed command is input into the ECU 10 to thereby cause the transition control of changing the engine speed more gradually than in the regulation control in response to a change in the total load torque T to be performed.

In the case where the total load torque T is less than the transition period set value Tm (T<Tm), i.e., in the case of running out of the transition period S (NO at step S4), the engine speed control is switched to the isochronous control. Specifically, the engine speed command section calculates and outputs an engine speed command for the isochronous control. The engine speed command is input to the ECU 10 to thereby cause the isochronous control of maintaining the engine speed at the constant second target speed N2 irrespective of the change in total load torque T to be performed. Specifically, performed is a processing which includes the feedback control for adjusting the fuel injection amount in response to a change in the total load torque T to thereby maintain the engine speed N at a constant value.

Thereafter, by repetition of the above-described steps, the regulation control depending the total load torque T, the isochronous control or the transition control for the transition period S between these controls is performed.

In this hybrid construction machine, the determination of the total load torque T which is the sum of the pump torque and the generator motor torque and the engine speed command based on the determined total load torque enables an appropriate speed control reflecting reflects accurately the load to be performed as a basic advantageous effect.

Furthermore, under the low load torque condition where the total load torque T is less than the reference set value Ts, performed is the isochronous control of maintaining the engine speed N at the second target speed N2 lower than the first target speed N1, allowing energy loss due to the power for auxiliary devices such as the fan 6 and the like to be reduced. Besides, setting the second target speed N2 within the speed range where the engine 1 and the generator motor 2 can be efficiently operated allows the engine 1 and the generator motor 2 to be operated with high energy efficiency.

In addition, in the transition period S between the regulation control under the high load torque condition and the isochronous control under the low load torque condition, performing the transition control of gradually changing the proportional gain Kp in response to a change in the total load torque T enables a gradual transition between the regulation control and the isochronous control to be made. This makes it possible to restrict the control from hunting and to prevent a sense of discomfort to be caused to an operator due to a sudden change in the engine speed N.

The transition control, however, can be omitted. In other words, also direct switching between the regulation control and the isochronous control can be performed. Even this enables the basic advantageous effects of appropriately controlling the engine speed based on the total load torque T, reducing energy loss due to the power for auxiliary devices, and efficiently operating the engine 1 and the generator motor 2 to be obtained.

As described above, provided is a hybrid construction machine including an engine and a generator motor and being capable of appropriate control of the engine speed based on a total load torque, reduction in energy loss due to the power for auxiliary devices, and efficient operation of the engine and the generator motor. The hybrid construction machine includes: a hydraulic actuator; a hydraulic pump for driving the hydraulic actuator; a generator motor configured to perform a generator action and a motor action; an engine serving as a power source for the hydraulic pump and the generator motor; an electric storage device to be charged with electric power generated by the generator action of the generator motor; and a control device which controls the speed of the engine. The generator motor is driven by an electric power stored in the electric storage device to perform the motor action, assisting the engine with a power generated by the motor action. The control device includes a total load torque determination section which detects a load torque of the hydraulic pump and a load torque of the generator motor and determines a total load torque which is the sum of the load torques, and an engine speed control section which controls the engine speed based on the determined total load torque. The engine speed control section performs a regulation control of increasing the engine speed along a regulation line with decrease in the total load torque under a condition where the total load torque is equal to or greater than a predetermined reference set value Ts and equal to or less than a rated torque corresponding to a rated speed N0, the regulation line joining the rated speed N0 and a first target speed N1 that is set for a condition where the total load torque is 0, and performs an isochronous control of maintaining the engine speed at a second target speed N2 lower than the first target speed N1 irrespective of the change in total load torque under a condition where the total load torque is less than the reference set value Ts.

The determination of the total load torque, which is the sum of the pump torque and the generator motor torque, and the control of the engine speed based on the determined total load torque allows an appropriate engine speed control that accurately reflects the load to be performed as the basic advantageous effect. The isochronous control performed in the low load torque condition where the total load torque is less than the reference set value, that is, the control of maintaining the engine speed at the second target speed N2 lower than the first target speed N1, makes it possible to reduce energy loss due to the power for auxiliary devices. Besides, setting the second target speed in the speed range where the engine and the generator motor can be efficiently operated enables the engine and the generator motor to be operated with high energy efficiency. In other words, it is possible to prevent the engine speed from decrease during the power generation by the generator motor, for example, differently from the case of setting a lower target speed of the regulation characteristic; this allows an operation under a condition where the fuel efficiency of the engine and the power generation efficiency of the generator motor are poor to be avoided.

The engine speed control section is preferred to perform, during a transition period between the regulation control and the isochronous control, a transition control of gradually changing a gain for controlling the engine speed in response to a change in the total load torque, for example, decreasing the proportional gain with increase in the total load torque. The transition control enables a gradual transition between the regulation control and the isochronous control to be made. This makes it possible to restrict control from hunting and to prevent a sense of discomfort from being caused to an operator due to a sudden change in the engine speed.

The invention claimed is:

1. A hybrid construction machine, comprising:
a hydraulic actuator;
a hydraulic pump for driving the hydraulic actuator;
a generator motor configured to perform a generator action and a motor action;
an engine serving as a power source for the hydraulic pump and the generator motor;
an electric storage device to be charged with electric power generated by the generator action of the generator motor; and
a controller which controls the speed of the engine, wherein:
the generator motor is driven by an electric power stored in the electric storage device to perform the motor action to assist the engine with a power generated by the motor action;
the controller includes a total load torque determination section which detects a load torque of the hydraulic pump and a load torque of the generator motor and determines a total load torque which is the sum of the load torques, and an engine speed control section which controls the engine speed based on the determined total load torque; and
the engine speed control section performs a regulation control of increasing the engine speed along a regulation line with decrease in the total load torque under a condition where the total load torque is equal to or greater than a predetermined reference set value Ts and equal to or less than a rated torque V corresponding to a rated speed N0, the regulation line joining the rated speed N0 and a first target speed N1 that is set for a condition where the total load torque is 0, and performs an isochronous control of maintaining the engine speed at a second target speed N2 lower than the first target speed N1 irrespective of the change in total load torque under a condition where the total load torque is less than the reference set value Ts and,
the engine speed control section performs a transition control of gradually decreasing a gain for controlling the engine speed between a first gain for the isochronous control and a second gain for the regulation control that is lower than the first gain as the total lead torque increases, during a transition period between the regulation control and the isochronous control.

* * * * *